United States Patent [19]
MacDonald

[11] Patent Number: 5,323,554
[45] Date of Patent: Jun. 28, 1994

[54] TUBE IDENTIFICATION BAND

[76] Inventor: Robert D. MacDonald, 8012 E. Via Campo, Scottsdale, Ariz. 85258

[21] Appl. No.: 99,073

[22] Filed: Jul. 28, 1993

Related U.S. Application Data

[63] Continuation-in-part of Ser. No. 872,291, Apr. 22, 1992, abandoned.

[51] Int. Cl.⁵ .............................................. G09F 3/08
[52] U.S. Cl. ...................................... 40/633; 40/661; 63/3; 63/DIG. 3; 403/298; 403/315
[58] Field of Search .................. 40/633, 660, 661, 665; 63/1.1, 2, 3, DIG. 3, 7; 403/298, 315; 24/116 A, 615, 616

[56] References Cited

U.S. PATENT DOCUMENTS

| | | |
|---|---|---|
| 839,047 | 12/1906 | Sylvester . |
| 1,371,925 | 3/1921 | Morgenthaler . |
| 2,449,181 | 9/1948 | Smiley . |
| 2,738,616 | 3/1956 | Windle . |
| 2,893,143 | 7/1959 | Mosher, Jr. et al. . |
| 2,954,620 | 10/1960 | Schneider . |
| 3,034,189 | 5/1962 | Twentier ........................... 63/7 X |
| 3,197,899 | 8/1965 | Twentier . |
| 3,412,577 | 11/1968 | Sauer .................................. 63/7 |
| 3,552,119 | 1/1971 | Newman et al. . |
| 3,625,549 | 12/1971 | Vries ............................. 403/315 X |
| 3,698,383 | 10/1972 | Baucom . |
| 3,800,450 | 4/1974 | Laugherty et al. . |
| 4,121,360 | 10/1978 | Vlerebome ......................... 63/2 X |
| 4,753,086 | 6/1988 | Schmidt . |
| 4,768,688 | 9/1988 | Harrigan . |
| 5,017,182 | 5/1991 | Mabie ........................... 403/298 X |

FOREIGN PATENT DOCUMENTS

| | | | |
|---|---|---|---|
| 905708 | 7/1972 | Canada ............................ 403/298 |
| 1000098 | 11/1949 | France .................................. 63/3 |
| 1033976 | 7/1953 | France . |

Primary Examiner—Brian K. Green
Attorney, Agent, or Firm—Dykema Gossett

[57] ABSTRACT

An inventive identification band includes a tube with a constant circular cross-section along the majority of its outer circumference. The tube holds an indicia, and the information on the indicia is magnified by the generally circular shape of the tube. The circular shape also minimizes contact between the band and the wearer. Contact is limited to line contact with the skin, and irritation of the skin is reduced by eliminating any edges which may cut or scrape the skin. A method of forming the identification band includes the steps of cutting a predetermined length of tube, placing an indicia therein, and completing the assembly by inserting an untapered cylindrical plug into each end of the tube.

10 Claims, 2 Drawing Sheets

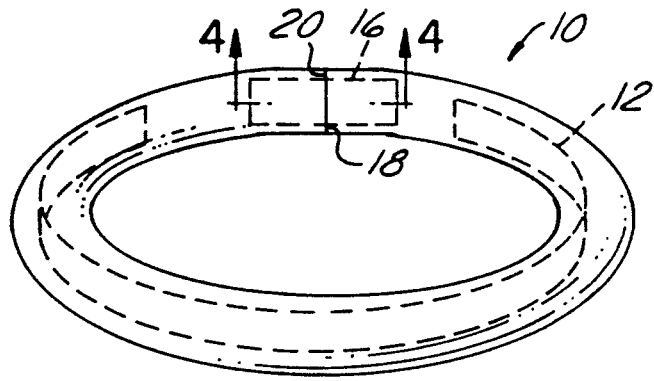
FIG. 1
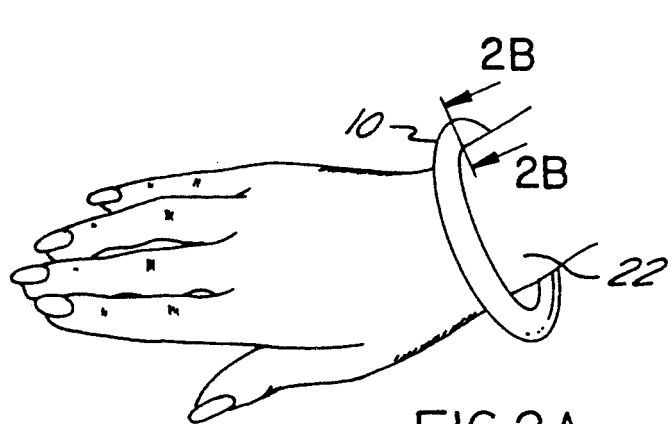
FIG. 2B
FIG. 2A
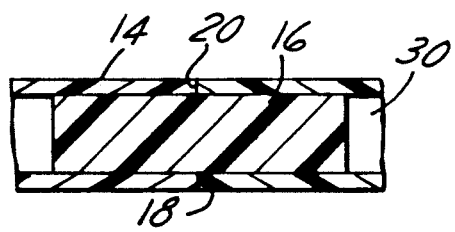
FIG. 4
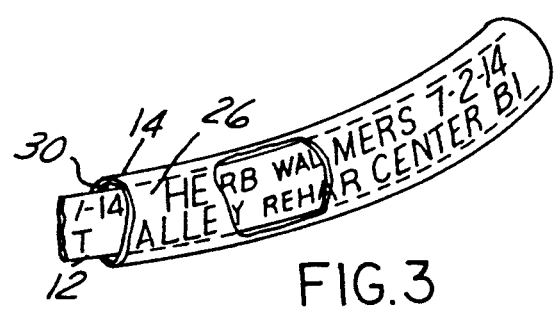
FIG. 3
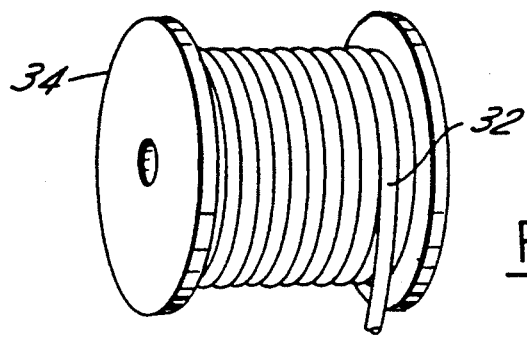
FIG. 5

TUBE IDENTIFICATION BAND

This application is a continuation-in-part of application Ser. No. 07/872,291 filed on Apr. 22, 1992, now abandoned.

BACKGROUND OF THE INVENTION

This invention relates to improved identification bands.

Identification bands have a variety of functions. The most common use of identification bands is in hospitals to identify and provide information on a patient. In hospitals in particular, the patient may often wear the band over an extended period of time. Prior art identification bands are generally flat, increasing contact with the skin. Flat identification bands also include edges which may cut or scrape the skin adjacent to the band. Over an extended period of time these bands can cause irritation to the skin. It would be a great advantage to reduce the contact area by even a small amount, and to eliminate any edges.

One known prior art identification band had a circular cross-section over a portion of its circumference. A generally planar flex section connects two separate tubular cross-section portions. This structure is an improvement over the basic prior art, however, the flex section still results in undesirable amounts of contact, and sharp edges. Further, this prior art device had an integral connecting plug on one of its tubular portions which is received within the other tubular portion. This structure would be undesirably expensive to manufacture.

Such bands may also be used on children during field trips, on people in nursing homes, and even on pets. Many prior art identification bands include complicated structures which make them expensive to manufacture, and difficult to use. Since these bands are used in large numbers, it would be desirable to reduce the costs of the band, and simplify their use.

SUMMARY OF THE INVENTION

The present invention discloses an identification band which greatly reduces contact with the person wearing the band. The transparent band has a circular tubular shape about its entire circumference such that any contact with the person is limited to line contact. This minimum contact with the patient reduces the likelihood of irritation. For identification purposes, the hollow band receives an indicia which is magnified when the information is read through the circular band. In a first embodiment, the band is assembled by inserting a cylindrical connection plug into each end of the tube.

A method disclosed by the present invention includes the steps of cutting a predetermined length of flexible, transparent tubing, and inserting an indicia into a hollow portion of the tube. The connection plug is then inserted into one end of the tubular member. The band is then positioned around the wearer, and the remaining end of the tubular member is inserted on the opposing end of the connecting plug. The connecting plug, which has a smooth outer surface along its cylindrical shape, has surprising retention capability. Solvent may also be applied to the connecting plug to render the connection even more secure. Alternatively, a circumferential clamping means may be applied over the opposed ends of the assembled of identification band. This clamping means is used in conjunction with a connection plug having circumferential grooves configured to cooperate with the clamping means contour to increase the tubing retention forces while maintaining a smooth non-irritating exterior surface.

These and other features of the present invention can be best understood from the following specification and drawings, of which the following is a brief description.

BRIEF DESCRIPTION OF THE DRAWINGS

FIG. 1 is a perspective view of an assembled identification band according to the present invention.

FIG. 2A is a perspective view of an identification band on a wearer.

FIG. 2B is a sectional view along line 2B—2B of FIG. 2A.

FIG. 3 is a fragmentary perspective view illustrating a feature of the present invention.

FIG. 4 is a sectional view along line 4—4 of FIG. 1.

FIG. 5 illustrates a tube roll used to form a portion of the present invention.

DETAILED DESCRIPTION OF A PREFERRED EMBODIMENT

Figure 6:
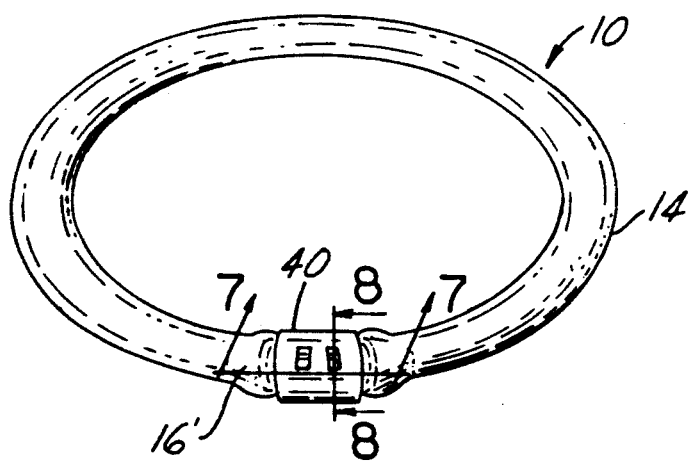
FIG. 6 is a perspective view of an assembled identification band according to an alternate embodiment of the present invention.
Figure 7:
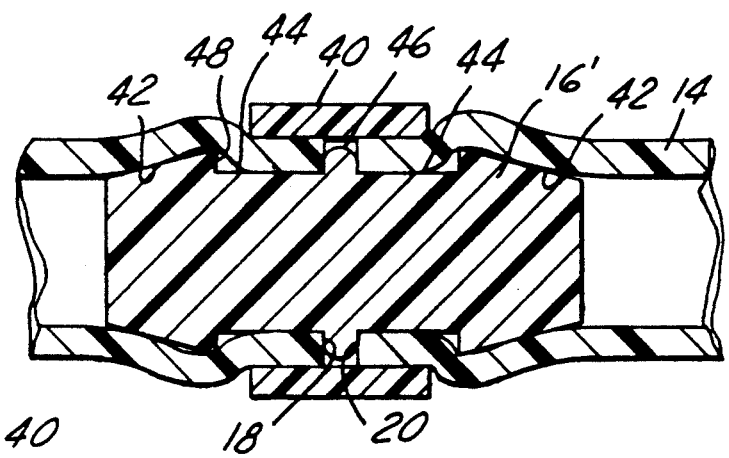
FIG. 7 is a sectional view along line 7—7 of FIG. 6.
Figure 8:
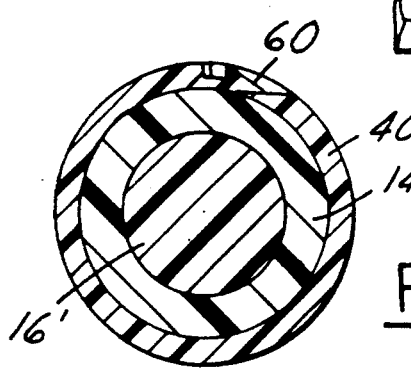
FIG. 8 is a cross-sectional view along line 8—8 of FIG. 6.
Figure 9:
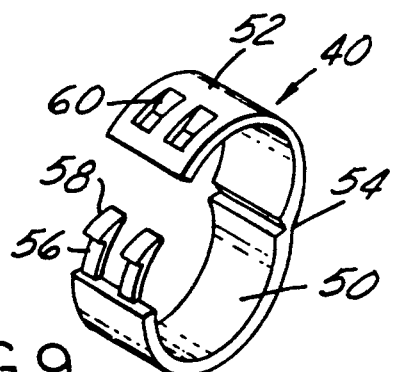
FIG. 9 is a perspective view of a clasp.

FIG. 1 illustrates identification band 10 which includes an indicia 12 that contains pertinent information on a wearer. Identification band 10 includes a flexible, transparent tubular member with a hollow interior. The flexible tubular member 14 is formed into a ring by securing ends with a connection plug 16 which has a generally untapered cylindrical shape.

Tubular member 14 has a constant circular cross-section throughout the entire circumference of the band 10. The connection between connection plug 16 and tubular member 14 is water proof such that indicia 12 is protected.

As illustrated in FIG. 2A, identification band 10 may be worn on a wrist 22. The identification band 10 is flexible, yet rigid enough to hold its ring-like shape.

As illustrated in FIG. 2B, due to the circular cross-section the portion of the identification band 10 which contacts the skin is limited to a line contact 24. This line contact 24 is the only contact maintained throughout the circumference of identification band 10.

The tubular member 14 has a radially outer wall 26 and a radially inner wall 28. The inner wall 28 defines a clear chamber 30 which houses the indicia 12. Due to the absence of a flat surface at any portion of the identification band 10, there exists no edge portion which might potentially scrape or cut the skin of the wearer.

As also shown in FIG. 2A, due to the ring shape of identification band 10, a great deal of the inner circumference of identification band 10 does not contact wrist 22.

As illustrated in FIG. 3, the indicia 12 is magnified when read through the curved outer wall 26 of tubular member 14. The curved outer wall 26 enlarges the lettering on the indicia 12 within clear chamber 30 to make the information more easily readable.

FIG. 4 illustrates connecting plug 16 inserted into ends 18 and 20 of the tubular member 14. The connecting plug 16 has a cylindrical, generally untapered shape and a smooth surface. Essentially, it may be a simple plastic rod. The connecting plug 16 is preferably solid, and more rigid than the flexible tubular member 14. The diameter of the connecting plug 16 is approximately equal to the inner diameter of inner walls 28 of tubular member 14.

The cylindrical connection plug 16 provides surprising retention capabilities. With this design, the ends 18 and 20 of the tubular member 14 are easily inserted over the connecting plug 16, yet surprisingly difficult to pull away from the connecting plug 16.

Although other plastics may be used, the tubular member 14 is preferably made from flexible PVC, while the connecting plug 16 is preferably made from a rigid PVC. This combination of material provides for a high coefficient of friction between the connecting plug 16 and the tubular member 14. Although the connection is quite secure, the application of a few drops of PVC solvent where the connecting plug 16 meets the tubular member 14 may be used to render the connection even more secure.

As illustrated in FIG. 5, the tubular member 14 is formed from clear, flexible tubing 32 stored on a roll 34. The tubular member 14 is cut to a predetermined size from roll 34 to fit the wearer. The indicia 12 is then inserted into the hollow interior of the tubular member 14, and the connecting plug 16 is inserted into one of the ends 18 and 20 of the tubular member 14. The tubular member 14 is then placed around the wearer, and the other end of the connecting plug 16 is inserted into the remaining end 18 and 20 of the tubular member 14, forming the identification band 10.

Since connecting plug 16 is cylindrical, it can be cut from plastic rod stock. The use of roll 34 and the connecting plug 16 thus allows commonly used material to form the identification band 10. This reduces the cost of identification band 10.

An alternate embodiment of the present invention is illustrated in FIG. 6. Once the tubular member 14 is secured with a connecting plug 16', a clasp 40 is fastened to the identification band 10.

Connecting plug 16' has a circular cross-section and tapered ends 42. A pair of circumferential grooves 44 are separated by a central rib 46, and the intersections of the grooves 44 with the large diameter portion of tapered ends 42 define shoulders 48. The tapered ends 42 of plug 16' allow the plug to be easily inserted into the tubular member 14. Upon insertion, the ends 18, 20 of the tubular member resiliently expand in diameter as they advance along the taper, then contract after passing shoulders 48 and stop when the ends of the tubular member abut untapered central rib 46. The resilient enlargement of tubular member 14 over the tapered ends of the plug 16', and the action of the edge of shoulders 48, enhance the resistance of the assembly to unintended removal of the tubular member from the plug.

Once the identification band 10 is formed, a clamping means in the form of clasp 40 is attached to the outer surface of the tubular member 14 around the 40 connecting plug 16' to secure the connection. Preferably, the cross-sectional diameter of grooves 44 is slightly smaller than the internal diameter of tubular member 14 so that, in cooperation with the thickness of clasp 40, the outside diameter of the identification band 10 at the clasp area 50 is substantially the same as the remaining portion of the identification band 10.

The clasp 40 is circular and has a width slightly smaller than the distance between shoulders 48 of the connecting plug 16'. The clasp 40 has an inner surface 50 and an outer surface 52. The inner surface 50 is shown smooth to prevent damage to the tubular member 14. Inner surface 50 may also be rough, or include circumferential ribs (not shown), to increase retention of ends of tubular member 14 from plug 16'. The clasp has a living hinge 54 to allow for opening and closure about plug 16'. The clasp locks into place by way of a plurality of prongs 56, having ramps 58, on one end of the clasp that extend through a plurality of corresponding prong receiving recesses 60 at the other end of the clasp. The locked clasp compresses the tubular member 14 against the connective plug 16' between the shoulders 48. The combination of the shoulders of plug 16' with clasp 40 bite into the tubing, thereby preventing removal of the tubular member 14.

Figure 10:
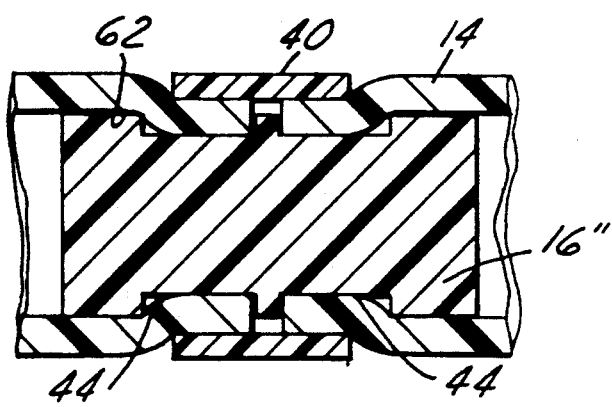
FIG. 10 is a sectional view of an alternate embodiment of the present invention.

In FIG. 10, an alternate embodiment of the present invention includes a connecting plug 16' having straight ends 62 instead of tapered ends 42, previously described.

Figure 11:
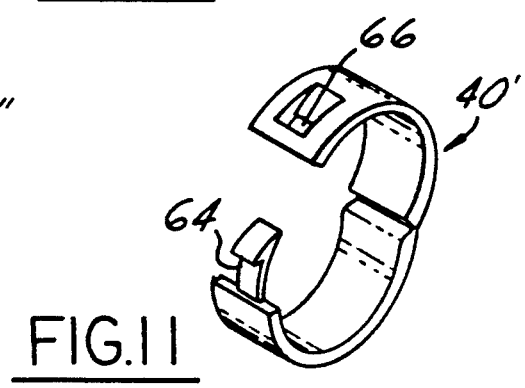
FIG. 11 is a perspective view of an alternate clasp.

In FIG. 11, an alternative embodiment of the present invention includes a clasp 40' including only one prong 64 and one prong receiving recess 66.

Several embodiments of the present invention have been disclosed. A worker of ordinary skill in the art, however, would realize that certain modifications of this invention will fall within the teachings of this application. Thus, the following claims should be studied in order to determine the true scope and content of the invention.

What I claim is:

1. A band, comprising:
a transparent flexible tubular member having two ends with a constant cross-section between said ends, said tubular member having a predetermined internal diameter and a predetermined external diameter, said tubular member having a hollow interior portion forming a chamber;
a connecting plug having a predetermined cross-sectional diameter received in each of said ends of said tubular member to couple said tubular member ends, said plug being of substantially circular cross-section and having first and second ends, said connecting plug having a circumferentially grooved center portion having a predetermined width, said grooved center portion reducing said cross-sectional diameter of said plug and forming a shoulder adjacent each of said ends of said plug; and
a circumferential clamping means surrounding and gripping each of said ends of said tubular member, said tubular member ends extending over said grooved center portion, said clamping means having a width extending within said width of said grooved center portion of said connecting plug, said clamping means preventing the removal of said ends of said tubular member from said connecting plug.

2. The band as recited in claim 1, wherein an identifying indicia is received within the tubular member.

3. The band as recited in claim 1, wherein said ends of said connecting plug are tapered to facilitate insertion into said ends of said tubular member.

4. The band as recited in claim 1, wherein said connecting plug has a circumferential rib, said rib being located approximately at a center between said first and second ends of said connecting plug and having a cross-sectional diameter greater than that of said grooved center portion and of said predetermined internal diameter of said tubular member, thereby preventing said connecting plug from being inserted into said ends of said tubular member beyond said rib.

5. The band as recited in claim 1, wherein said clamping means includes a living hinge, said living hinge permitting said clamping means to be opened for assembly over the tubular member ends, said clamping means having first and second ends, said clamping means having cooperating locking means on said first and second ends of said clamping means, said locking means being adapted to lock said clamping means in a closed position.

6. The band as recited in claim 5, wherein said cooperating locking means includes prong means at said first end of said clamping means and prong receiving recess at said second end of said clamping means, said receiving recess being adapted to receive and retain said prong means to thereby lock said clamping means in a closed position.

7. An identification band, comprising:
a transparent flexible tubular member having two ends with a constant cross-section between said ends, said tubular member having a predetermined internal diameter and a predetermined external diameter, said tubular member having a hollow interior portion forming a chamber;
an identification indicia received in said chamber of said tubular member;
a connecting plug having a predetermined cross-sectional diameter received in each of said ends of said tubular member to couple said tubular member ends, said plug being of substantially circular cross-section and having first and second ends, said plug having a circumferentially grooved center portion having a predetermined width, said grooved center portion reducing said cross-sectional diameter of said plug and forming a shoulder adjacent each of said ends of said plug; and
a circumferential clamping means surrounding and gripping each of said tubular member ends when said tubular member ends have been advanced over said grooved center portion, said clamping means having a width extending within said width of said grooved center portion of said connecting plug, said clamping means preventing the removal of said tubular member ends from said connecting plug, whereby said identifying indicia may be inserted within said tubular member prior to assembly with said connecting plug.

8. The identification band as recited in claim 7, wherein said connecting plug includes a circumferential rib, said rib being located approximately at a center between said first and second ends of said connecting plug and having a cross-sectional diameter greater than that of said grooved center portion and greater than said predetermined internal diameter of said tubular member, thereby preventing said connecting plug from being inserted into said ends of said tubular member beyond said rib.

9. The identification band as recited in claim 7, wherein said clamping means includes a living hinge, said living hinge permitting said clamping means to be opened for assembly over the tubular member ends, said clamping means having first and second ends, said clamping means having cooperating locking means on said first and second ends of said clamping means, said locking means being adapted to lock said clamping means in a closed position.

10. The identification band as recited in claim 9, wherein said cooperating locking means includes prong means at said first end of said clamping means and prong receiving recess at said second end of said clamping means, said receiving recess being adapted to receive and retain said prong means to thereby lock said clamping means in a closed position.

* * * * *